Figure 1:
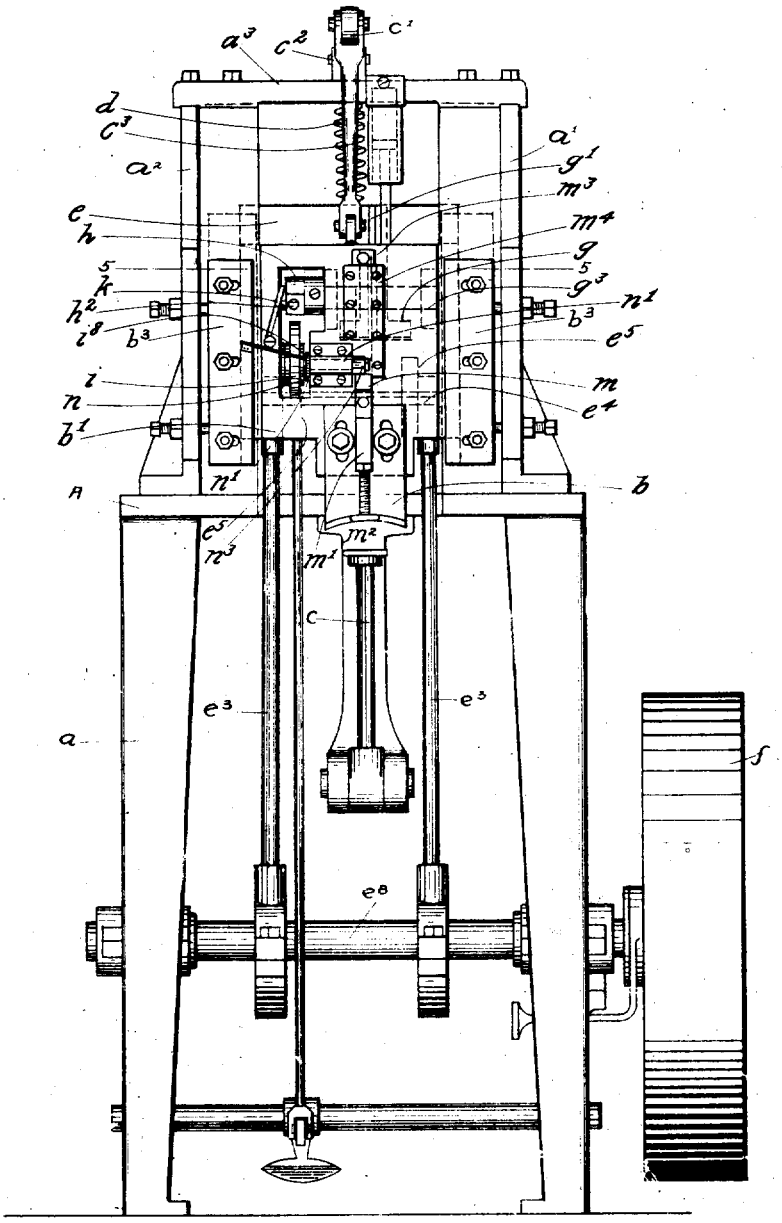

B. B. WATERMAN.

HEEL BREASTING MACHINE.

APPLICATION FILED OCT. 18, 1904.

Reissued Apr. 30, 1912

13,413.

4 SHEETS—SHEET 1.

WITNESSES

Elizabeth C. Coyle

Bernard Barrows

INVENTOR

Bradford B. Waterman

By his Attorney

Nelson W. Durand

B. B. WATERMAN.

HEEL BREASTING MACHINE.

APPLICATION FILED OCT. 18, 1904.

Reissued Apr. 30, 1912.

13,413.

SHEETS—SHEET 2.

WITNESSES

Elizabeth C. Coyle

Bernard Barrows

INVENTOR

Bradford B. Waterman

By his Attorney

Nelson A. Howard

B. B. WATERMAN.

HEEL BREASTING MACHINE.

APPLICATION FILED OCT. 18, 1904.

Reissued Apr. 30, 1912. 13,413.

4 SHEETS—SHEET 3.

WITNESSES

Elizabeth C. Coyle

Bernard Burrows

INVENTOR

Bradford B. Waterman

By his Attorney

Nelson W. Konard

B. B. WATERMAN.

HEEL BREASTING MACHINE.

APPLICATION FILED OCT. 18, 1904.

Reissued Apr. 30, 1912.

13,413.

4 SHEETS—SHEET 4.

WITNESSES

Elizabeth C. Conly

Bernard Barnes

INVENTOR

Bradford B. Waterman

By his Attorney

Nelson B. Kennard

UNITED STATES PATENT OFFICE.

BRADFORD B. WATERMAN, OF EAST BRIDGEWATER, MASSACHUSETTS, ASSIGNOR TO UNITED SHOE MACHINERY COMPANY, OF PATERSON, NEW JERSEY, A CORPORATION OF NEW JERSEY.

HEEL-BREASTING MACHINE.

13,413. Specification of Reissued Letters Patent. Reissued Apr. 30, 1912.

Original No. 738,502, dated September 8, 1903, Serial No. 123,386. Application for reissue filed October 18, 1904. Serial No. 229,029.

*To all whom it may concern:*

Be it known that I, BRADFORD B. WATERMAN, a citizen of the United States, residing at East Bridgewater, in the county of Plymouth and Commonwealth of Massachusetts, have invented a new and useful Improvement in Heel-Breasting Machines, of which the following is a specification.

It is now customary to employ in conjunction with a heel-breasting knife a stop which by striking the shank of the shoe limits the descent of the knife; but in practice some shanks are more yielding than others and as a result the knife descends variable distances or until the stop meets with a predetermined resistance, and as a result the sole is frequently seriously injured by the knife cutting too deep, and it is this uncertain travel or stroke of the knife that my invention seeks to overcome. Furthermore, the pressure applied to the breasting knife in its movement through the lifts of a heel necessarily varies according to the resistance encountered, the latter depending on the composition and form of the heel. This variation in pressure also occasions objectionable irregularities in limiting the stroke of the knife, particularly in those machines where the stroke is controlled by rendering inoperative at the desired time mechanism for transmitting motion from a source of power to the knife.

In the preferred embodiment of my invention I provide means to limit the stroke of the breasting knife adapted to be actuated independently of the degree of pressure on the knife, and independently of any variations in the shank of the shoe operated upon. I preferably employ mechanism to control the transmission of motion from an actuating means to the knife, the operation of said mechanism being independent of the conditions above mentioned. In the embodiment illustrated I have also provided means for returning the knife independently of the actuating means so that when the effective relation between the actuating means and knife is terminated the knife will be automatically moved away from the work.

In the preferred embodiment of my invention a suitable engaging device is interposed between the knife-holder and its actuator, which is adapted to be operated by a stop which strikes the shank of the shoe and at such time to disengage the knife-holder from its actuator, whereby said knife-holder is permitted to ascend or return to its normal position independently of its actuator.

Figure 2:
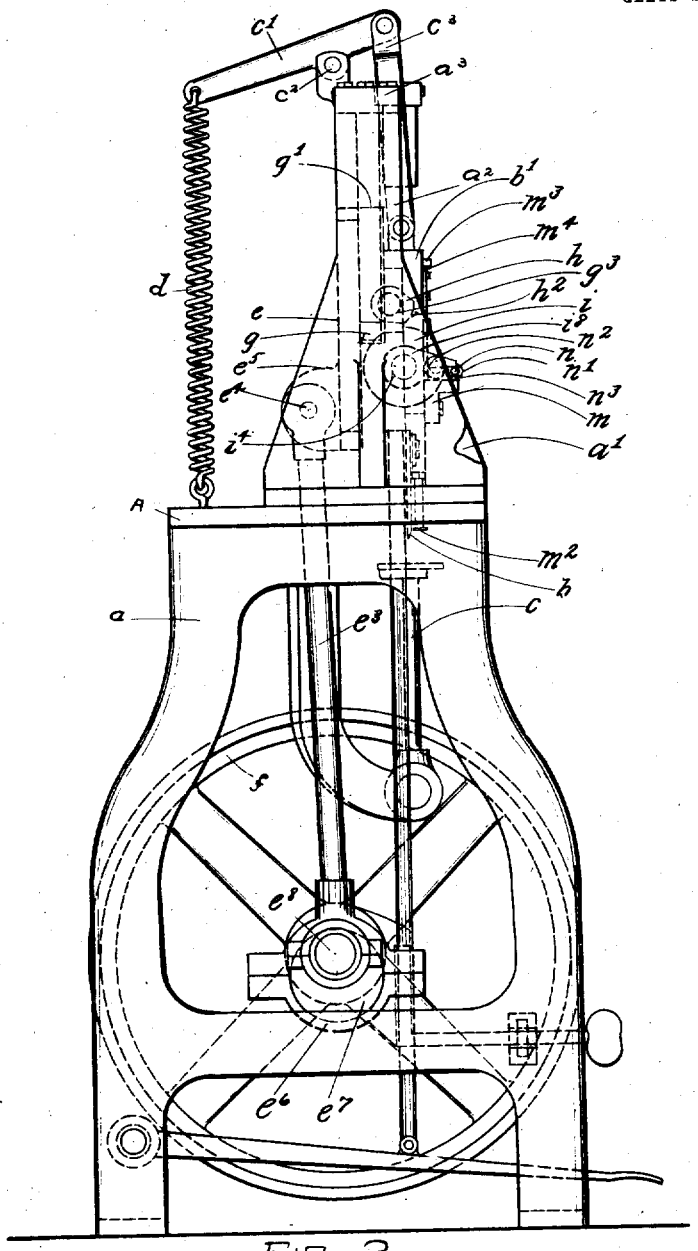
Figure 3:
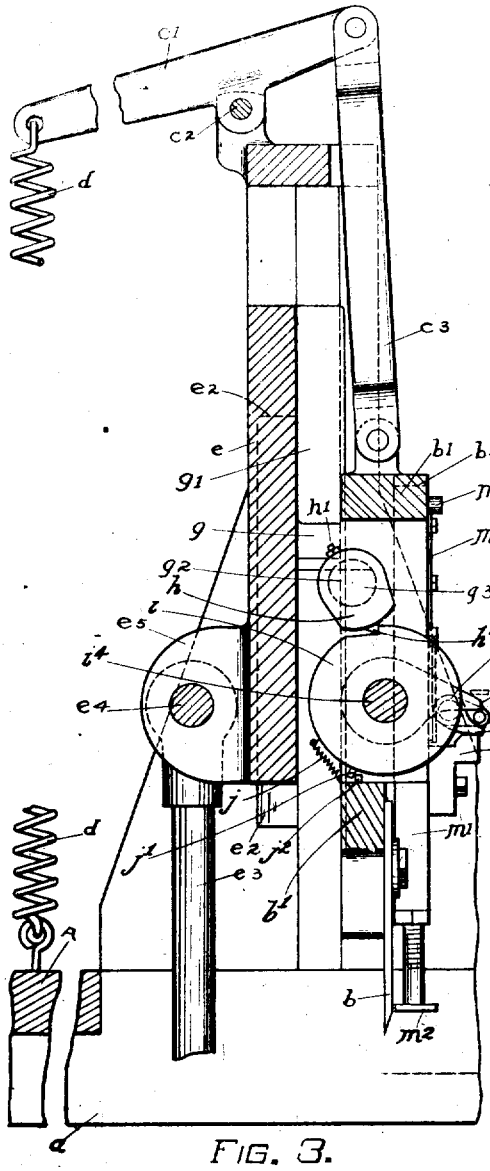
Figure 4:
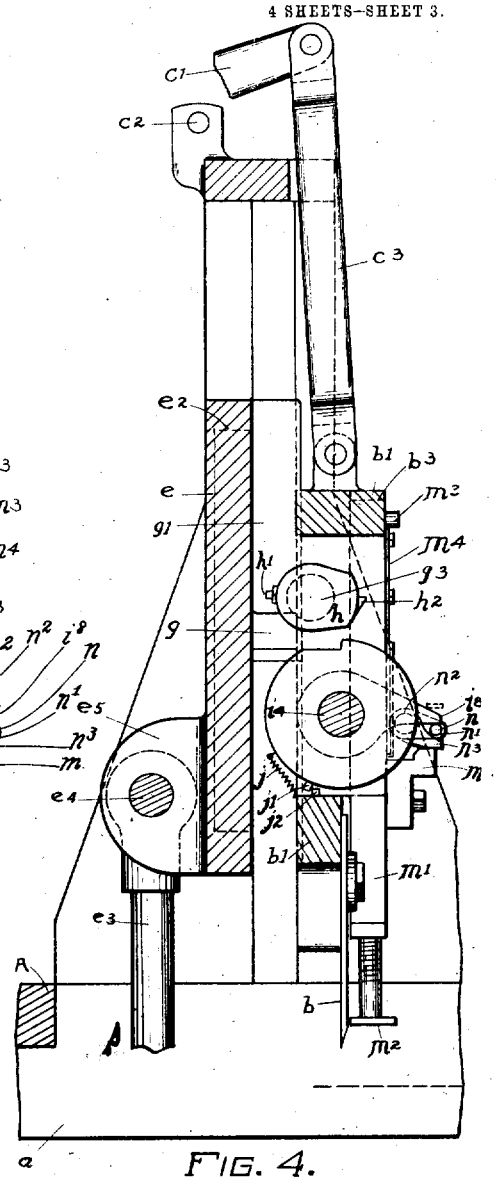
Figure 5:
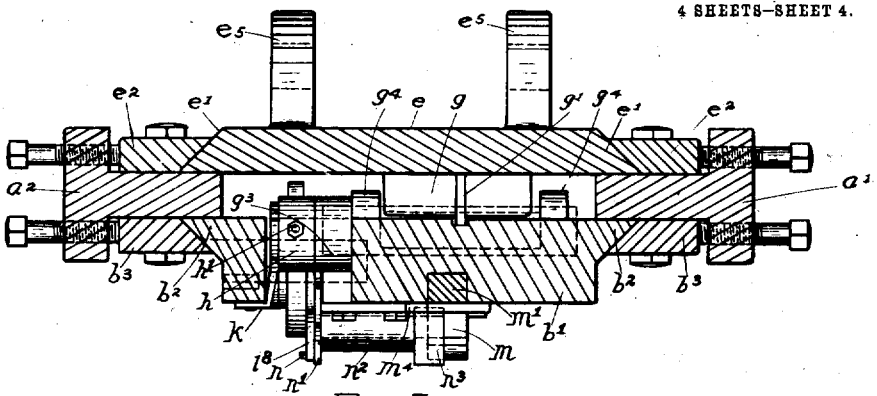
Figure 7:
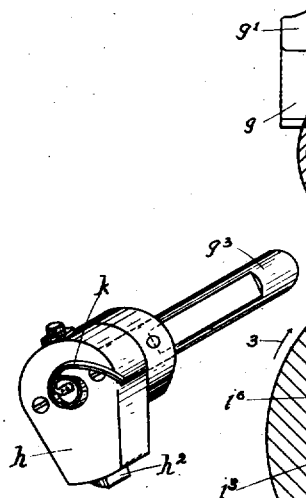
Figure 8:
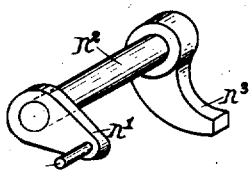
Figure 6:
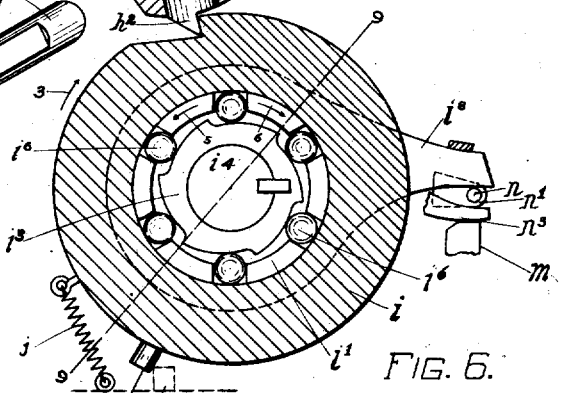
Figure 9:
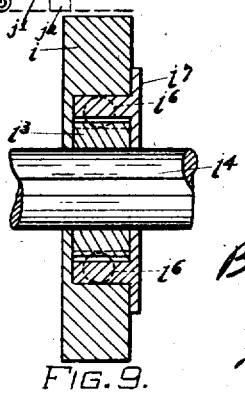

Figure 1 shows in front elevation a heel-breasting machine embodying this invention. Fig. 2 is a side elevation of the machine shown in Fig. 1. Fig. 3 is a vertical section of the knife-holder, its actuator, and adjacent parts, all of the parts being in their normal positions. Fig. 4 is a similar sectional detail, the knife-holder being in its normal position, having just returned independently of its actuator and the actuator being part way up on its return stroke. Fig. 5 is a horizontal section of the head of the machine taken on the dotted line 5—5, Fig. 1. Fig. 6 is an enlarged sectional detail of the clutch mechanism and dog. Fig. 7 is a perspective view of the dog and shaft bearing it, which forms a coöperative part of the engaging device between the knife-holder and actuator. Fig. 8 is a perspective view of the means provided for operating the clutch to release the engaging device, which is interposed between the knife-holder and actuator. Fig. 9 is a sectional detail of the clutch taken on the dotted line 9—9, Fig. 6.

A represents the base-plate of the machine, which is supported upon legs $a$. Suitable uprights $a'$, $a^2$ are erected upon the base-plate, which are connected together at their upper ends by a cross-piece $a^3$, to thereby form a suitable framework for the operating parts.

The knife $b$, which may be of any usual or suitable shape and construction, is attached to a vertically-movable knife-holder $b'$, which, as herein shown, is composed of a plate having its opposite side edges beveled, as at $b^2$, to form guides, and gibs $b^3$ are adjustably attached to the uprights $a^2$, which overlie the beveled side edges of the knife-holder and in conjunction with said uprights $a^2$ form vertical guideways for said knife-holder. The knife-holder has an up-and-down movement, and the knife while descending will cut the breast of the heel from the top lift thereof to the base when the shoe is supported in an inverted position in any suitable holder or jack $c$. An actuator, to be described, is provided for moving the knife-holder downward, and means independently thereof is provided for raising the knife-holder, said means, as herein shown, consisting of a spring $d$, attached at one end to the base-plate A or other fixed support and at its opposite end to one end of an arm $c'$, pivoted at $c^2$ to the framework, the opposite end of said arm $c'$ being connected by a link $c^3$ with the knife-holder $b'$. The actuator moves the knife-holder downward against the action of the spring $d$, and the latter when permitted to act restores or raises said knife-holder.

The actuator for the knife-holder is herein shown as adapted to be driven by power, and consists of a plate $e$, supported by the framework close to the knife-holder $b'$ and movable vertically in parallelism with the knife-holder and having its opposite side edges beveled, as at $e'$, to form guides, and gibs $e^2$ are adjustably attached to the uprights $a'$, $a^2$, which overlie the beveled side edges of the plate $e$ and in conjunction with said uprights form vertical guideways for said plate $e$. The upper end of an eccentric-rod $e^3$ is loosely connected at $e^4$ to an ear $e^5$ on the back side of the plate $e$, and the opposite end of said eccentric-rod has a strap $e^6$, which embraces an eccentric-disk $e^7$, secured to a shaft $e^8$, having its bearings in the main framework. I prefer to provide the machine with two of these eccentric-rods, adapted to be operated by eccentrics secured to the shaft $e^8$, the upper ends of both of said rods being connected to the plate $e$. The shaft $e^8$ will be driven by a pulley $f$, which is connected therewith by a suitable clutch of any description, whereby the shaft will be given a single revolution each time the clutch is operated to engage the shaft with the pulley, many forms of clutches for this purpose being well known.

The plate $e$ has formed on its front side or face an inverted T-shaped projection, of which $g$ represents the horizontal bar or portion and $g'$ the vertical portion thereof, and said projection is caused to project far enough toward the knife-holder to engage the slabbed-off side of the segmental portion $g^2$ of a shaft $g^3$, which latter has its bearings in ears $g^4$, projecting from the back side of the knife-holder $b'$. When the knife-holder is in its normal elevated position, the shaft $g^3$ is adapted to be locked in a position of rest, so that the projection on the actuator may engage it and remain in continuous engagement with it while the actuator descends, thereby moving the knife-holder downward with it, and then as the knife-holder arrives at its lowermost position said shaft $g^3$ will be unlocked and permitted to turn on its axis a partial revolution sufficient to disengage the projection on the actuator, at which time said knife-holder is free to return, independently of its actuator, to its normal position, and as it returns the shaft $g^3$ will be still held in its abnormal position while passing over the vertical portion $g'$ of the projection on the actuator, and as soon as the actuator arrives at its elevated position the shaft $g^3$ will be permitted to resume its normal position.

I do not desire to limit my invention to the particular shape or construction of the projection or shaft $g^3$ so long as they are adapted to engage and be disengaged at the proper times, and thereby constitute an engaging device between the actuator and knife-holder, and consequently any other movable member properly constructed to subserve the functions of the shaft $g^3$ will be considered as an equivalent of it.

The shaft $g^3$ has secured to one of its projecting ends a dog which is adapted to engage one member of a clutch to be described.

$h$ represents the dog-support, which is made as a block, which is secured to one end of the shaft $g^3$, and said block $h$ has a hole through it diametrically to receive the dog, which latter, as herein shown, consists of a pin $h'$, formed with a projecting latch-like end portion $h^2$ and shouldered within the support to form an abutment for one end of a spring $h^3$, which surrounds the pin and which is contained in a recess in the block $h$. The tendency of the spring $h^3$ is to thrust the dog outward, yet permits said dog to be thrust inward in a yielding manner. The dog normally enters a notch cut or formed in the outer side or face of a ring $i$, which is mounted loosely upon a stud or shaft $i^4$, said ring $i$ serving as one member of a clutch, and within said ring $i$ and securely fixed to said stud or shaft is a hub $i^3$, which is formed externally with a plurality of inclined faces, and said hub is made much smaller in diameter than the recess in the ring $i$, so as to provide ample space between the hub and ring for a set of balls $i^6$, there being, preferably, one ball between each inclined face of the hub and the ring. The balls are held in place and are moved in one or the other direction by a ball-retaining device or holder, which is herein shown as a ring $i^7$, mounted loosely on the stud or shaft $i^4$ and having a plurality of laterally-projecting fingers $i'$, there being one finger for each ball, and said fingers are disposed between the balls so as to engage and move them in one or the other direction as the ring $i^7$ is turned. Whenever the ring $i^7$ is turned in the direction of the arrow 6, Fig. 6, the several balls will be moved thereby in a corresponding direction and will be wedged between the inclined faces of the hub and the interior of the ring $i$, and thereby frictionally connect said ring $i$ with the fixed hub. The normal tendency of the dog $h^2$ is to turn the ring $i$ in the direction of the arrow 3, and this acts to move the balls in the same direction to wedge them between the hub and the ring. Whenever the ball-retaining ring $i^7$ is moved in the direction of the arrow 5, Fig. 6, the balls will be moved in the direction opposite to the arrow 3 and will instantly disengage the ring $i$ from the hub $i^3$, thereby permitting said ring $i$ to freely turn in the direction of the arrow 3 independently. The ball-retaining ring $i^7$ has secured to it a finger $i^8$, which projects far enough to be engaged by a suitable actuating device for the purpose of lifting it, to thereby positively turn said ring $i^7$ and disengage the member $i$. As the actuator $e$ descends the dog will remain in engagement with the clutch, and thereby cause the knife-holder to correspondingly descend. The projection $g$ just overlaps or projects onto the shaft $g^3$, and therefore tends to turn said shaft, and as a result the dog has a constant tendency to turn the ring $i$ in the direction of the arrow 3 while the actuator is descending, and would turn it if said ring were not locked by the clutch. The finger $i^8$ of the clutch rests by gravity upon a pin $n$, projecting laterally from one end of a short arm $n'$, secured to a shaft $n^2$, having its bearings on the front side of the knife-holding plate $b'$, and at the opposite end of said shaft $n^2$ a short arm $n^3$ is secured, which overlies an arm $m$, secured to the front side of a bar $m'$, which latter is vertically disposed in a suitable recess in the front side of the plate $b'$ and has a vertical movement therein. The bar $m'$ bears at its lower end a plate $m^2$, which is adjustably connected to the bar, said plate being adapted to strike the shank of the shoe when the knife-holding plate descends. The bar $m'$ rests by gravity in the recess in the plate $b'$ and has a laterally-projecting pin $m^3$ at its upper end, which rests upon the upper end of a plate $m^4$, which is secured to the plate $b'$ and which closes the recess for the bar $m'$. While the finger $i^8$ rests by gravity upon the pin $n$ the ball-retaining ring $i^7$ will be held turned in the direction of the arrow 6, so as to cause the balls to firmly engage the ring $i$ and hub, and thereby lock said ring or member $i$ against movement in the direction of the arrow 6; but when the arm $m$ lifts said finger the ball-retaining ring will be moved in the direction of the arrow 5, and the ring or member $i$ will be instantly released. As soon as the ring or member $i$ is released the pressure upon it in the direction of the arrow 3, which is exerted by the dog and projection $g$, causes said ring or member $i$ to turn on its axis far enough for the dog to disengage it, as shown in Fig. 4, and as soon as the dog thus disengages the ring or member $i$ it will be turned by the projection $g$ far enough for the shaft $g^3$ to disengage said projection $g$ and permit said projection $g$ to pass by it, and it is at this time that the knife-holder, being disengaged from its actuator, is free to rise and return independently of the actuator. As the knife-holder rises the dog is held in its abnormal position by the shaft $g^3$ passing along on the projection $g'$. The actuator immediately returns to its normal position, following the knife-holder, and as soon as it arrives at its normal elevated position the shaft $g^3$ passes beneath the projection $g$ and the dog is permitted to resume its normal position in engagement with the ring or member $i$. The dog is returned to its normal position by means of a spring $k$. When the ball-retaining ring is disengaged from the ring or member $i$ by raising the finger $i^8$ and said ring or member $i$ is moved in the direction of the arrow 3 far enough to disengage the dog, the notch in the ring or member $i$ will be carried out of its normal position, and to turn said ring so as to bring said notch back to its normal position a spring $j$ is provided, one end of which is connected to the ring or member $i$ and the other end to a fixed support, the tendency of said spring being to turn the ring or member $i$ in a direction opposite the arrow 3. A projection $j'$ is formed on the ring or member $i$, which is adapted to engage a stop $j^2$ on the frame to limit the return movement of the ring $i$ and determine its normal position relative to the other parts, and the spring $j$ moves or returns said ring or member $i$ until the projection $j'$ is brought into engagement with the stop $j^2$.

I do not desire to limit my invention to the details of construction herein shown and described, as, so far as the breadth and scope of my invention are concerned, many changes may be made.

The operation is as follows: The parts being in their normal positions, as represented by Figs. 1, 2, and 3, the main shaft $e^8$ is engaged and given one complete revolution, and during this revolution the actuator descends with its projection $g$ in engagement with the slabbed-off side of the shaft $g^3$, while the other clutch is held positively, and the knife-holder will be correspondingly moved downward with the actuator until the plate $m^2$ strikes the shank of the shoe, the knife during its descending movement cutting the breast of the heel. The moment the plate $m^2$ strikes the shank of the shoe the bar $m'$ ceases to move farther, and as the knife-holder continues the arm $m$ on the bar $m'$ lifts the arm $n^3$, and thereby correspondingly lifts the arm $n'$ and raises the finger $i^8$ of the clutch, disengaging the ring or member $i$ from the fixed hub and instantly permitting the dog to turn on its axis by the pressure of the actuator upon the slabbed-off side of the shaft $g^3$, and as said dog turns it turns the ring or member $i$ of the clutch independently, so that the actuator becomes disengaged from the knife-holder and ceases to move said knife-holder downward. As soon as the dog disengages the ring or member $i$ the spring $d$ is permitted to act and lift the knife-holder independently of its actuator, restoring it to its normal elevated position. As the knife-holder rises all the parts connected with it correspondingly rise, yet the slabbed-off side of the shaft $g^3$ contiuues to engage the vertical bar or portion $g'$ of the projection on the actuator $e$, so that the dog is still held from engagement with the clutch even though the knife-holder should be completely restored to its normal elevated position. While the knife-holder rises, the ring or member $i$ returns to its normal position, and the gravitating finger $i^3$ also resumes its normal position and locks the clutch. While the actuator $e$ rises, the dog, however, still remains out of engagement with the ring or member $i$; but just as the actuator resumes its normal elevated position the slabbed-off side of the shaft $g^3$ passes beneath the bar $g$, and said shaft and dog carried by it resume their normal positions again, engaging the ring or member $i$.

Having thus described my invention, what I claim as new, and desire to secure by Letters Patent is:—

1. In a heel-breasting machine, the combination of a knife and knife-holder, an actuator for said knife-holder, means for returning the knife-holder independently of its actuator, and means for disengaging the knife-holder from its actuator whereby it is free to return independently thereof, substantially as described.

2. In a heel-breasting machine, the combination of a knife and knife-holder, an actuator for said knife-holder, means for returning the knife-holder independently of its actuator, a stop for controlling the descent of said knife-holder, and means operated by said stop for disengaging the knife-holder from its actuator whereby it is free to return independently thereof, substantially as described.

3. In a heel-breasting machine, the combination of a knife and knife-holder, an actuator for said knife-holder, means for returning said knife-holder independently of its actuator, an engaging device interposed between said knife-holder and actuator, and means for operating said engaging device to disengage the knife-holder from its actuator, substantially as described.

4. In a heel-breasting machine, the combination of a knife and knife-holder, an actuator for said knife-holder, means for returning said knife-holder independently of its actuator, an engaging device interposed between said knife-holder and actuator, a stop and means operated by it for operating said engaging device to disengage the knife-holder from its actuator, substantially as described.

5. In a heel-breasting machine, the combination of a knife and knife-holder, an actuator for said knife-holder, an engaging device interposed between said knife-holder and actuator, clutch mechanism for controlling the operation of said engaging device, and a stop for operating said clutch mechanism to in turn operate the engaging device to disengage the knife-holder from its actuator, whereby said knife-holder is free to return independently of its actuator, substantially as described.

6. In a heel-breasting machine, the combination of a knife and knife-holder, an actuator for said knife-holder, an engaging device interposed between said knife-holder and actuator, clutch mechanism for controlling the operation of said engaging device, a stop for operating said clutch mechanism to in turn operate the engaging device to disengage the knife-holder from its actuator, whereby said knife-holder is free to return independently of its actuator and means for restoring said clutch mechanism, the operation of which is controlled by said actuator, substantially as described.

7. In a heel-breasting machine, the combination of a knife, a vertically-movable knife-holder, a vertically-movable actuator for said knife-holder, an engaging device interposed between said actuator and knife-holder, means for operating said engaging device to disengage the knife-holder from its actuator, and a spring for returning said knife-holder independently of its actuator, when disengaged therefrom, substantially as described.

8. In a heel-breasting machine, the combination of a knife, a knife-holder, an actuator for said knife-holder having a projection, a shaft carried by the knife-holder having a segmental portion adapted to be engaged by said projection and also having a dog, clutch mechanism which said dog engages, also carried by said knife-holder and a stop movably connected with said knife-holder for operating said clutch mechanism to release the dog, substantially as described.

9. In a heel-breasting machine, the combination with a knife and knife-holder, an actuator for said knife-holder, means for returning said knife-holder independently of its actuator, an engaging device interposed between said knife-holder and actuator, a stop movably connected with said knife-holder and means operated by it for operating said engaging device, substantially as described.

10. In a heel-breasting machine, the combination of a knife and knife-holder, an actuator for said knife-holder, means for returning the knife-holder independently of its actuator; a stop for controlling the descent of said knife-holder movably connected therewith, and means operated by said stop for disengaging the knife-holder from its actuator whereby it is free to return independently thereof, substantially as described.

11. A heel breasting machine, having, in combination, a knife, actuating means, mechanism for transmitting motion from the actuating means to the knife arranged to become ineffective to impart movement to the knife, a plurality of members arranged for relative movement, means for frictionally connecting said members, means actuated by engagement with the sole of the shoe for disconnecting said members, and means for controlling said mechanism in accordance with the relation between said members.

12. A heel breasting machine, having in combination, a knife, a knife carrier, actuating means therefor, mechanism for transmitting motion from the actuating means to the knife including parts constructed for relative movement to render said mechanism ineffective to transmit said motion and arranged to cause said relative movement of said parts to be effective by reaction to pressure transmitted to the knife, means for normally retaining said mechanism in effective condition and means for automatically rendering it ineffective whereby the cutting movement of the knife is checked.

13. A heel breasting machine, having in combination, a knife, actuating means, mechanism for transmitting motion from the actuating means to the knife including parts constructed for relative movement to render said mechanism ineffective to transmit said motion and arranged to cause said relative movement of said parts to be effected by reaction to pressure transmitted to the knife, means for normally retaining said mechanism in effective condition, means for automatically releasing said mechanism to check the cutting movement of the knife and means for automatically restoring said mechanism to its effective condition.

14. A heel breasting machine having, in combination, a knife, actuating means therefor, and mechanism including a make and break connection for transmitting motion from the actuating means to the knife, said mechanism being constructed and arranged to set up, as a result of the reaction to pressure transmitted to the knife to force it through the work, stresses tending to break such connection and produce an interruption of the cutting stroke of the knife, and means operated by prearranged resistance encountered during the operative stroke to release said stresses, substantially as described.

15. A heel breasting machine, having in combination, a knife, a knife carrier, an actuator therefor, mechanism for transmitting movement from the actuator to the knife carrier including a member pivotally mounted for turning movement to render said mechanism ineffective to transmit movement to the knife carrier, said actuator and said member being relatively constructed and arranged so that a turning force is imparted to said member by the actuator during the movement of the knife through the the work, means for normally restraining the turning movement of said member and means for automatically releasing said restraining means to check the cutting movement of the knife.

16. A heel breasting machine having, in combination, a knife, actuating means therefor, mechanism for transmitting motion from the actuating means to the knife so constructed and arranged that the reaction to pressure transmitted to the knife during its passage through the work tends to render said mechanism ineffective and means arranged for contact with the work to trip said mechanism and permit it to become ineffective.

17. A heel breasting machine, having, in combination, a knife, a knife carrier, actuating means therefor, mechanism for transmitting motion from the actuating means to the knife carrier constructed and arranged so that resistance offered to the movement of the knife tends to disconnect said mechanism from said carrier, means restraining said mechanism from disconnection and means acting when the knife has reached the shank portion of the shoe to permit the disconnection of the carrier from the actuator.

18. A heel breasting machine, having, in combination, a knife, a knife carrier, retracting means for the carrier, an actuator, mechanism between the actuator and the carrier for moving the carrier to effect the cutting stroke of the knife, said mechanism being constructed and arranged to be disconnected from the actuator by pressure applied through the knife in the direction of its movement, means restraining said mechanism from disconnection, and means actuated by contact with the shoe to permit such pressure to become effective when the knife has reached the edge of the heel next the shank.

19. A heel breasting machine, having in combination, an actuator having a reciprocating movement, a knife carrier arranged for movement in the same direction as the actuator, means upon one of said parts arranged to rotate about an axis extending transverse to said reciprocating movement and having a portion to one side of its axis lying in the path of a portion of the other of said parts whereby it tends to rotate about said axis and the parts are constrained to move together in one direction when said rotatable means is held from rotation, said rotatable means being constructed and arranged to clear each other when permitted to rotate, means normally restraining said rotatable means from rotation and means carried by a moving part arranged to release said rotatable means when the movement of said moving means is stopped.

20. A heel breasting machine, having, in combination, an actuator having a constant stroke, a knife carrier arranged for movement parallel therewith, rotatable means mounted upon said carrier on an axis transverse to the direction of movement of the carrier and arranged in the path of a portion of said actuator for movement of the carrier by the actuator, said means being constructed and arranged to clear said other part when permitted to rotate, means normally restraining said rotatable means from rotation, and shoe engaging means carried by the carrier arranged to release said rotatable means when the motion of said shoe engaging means is stopped.

21. A heel breasting machine having, in combination, a knife, a knife carrier, actuating means therefor including a power driven actuator, means on the carrier mounted for movement into and out of the path of the actuator and through which the actuator operates to drive the knife carrier, said means being so mounted that pressure of the actuator thereupon tends constantly to move the same out of the path of the actuator, means for holding said means in the path of the actuator, and means for releasing the said holding means after a predetermined movement of the knife relatively to the shoe.

22. A heel breasting machine having, in combination, a knife carrier, an actuator therefor, a pivoted detent on one of said parts lying normally in the path of the other part, the pressure of which upon the detent tends to turn it out of said path, means for holding the detent against movement and means operating upon contact with the shoe for releasing the detent.

In testimony whereof I have signed my name to the specification in the presence of two subscribing witnesses.

BRADFORD B. WATERMAN.

Witnesses:

E. Hector Ellis,

William H. Geary.